3,165,386
VACUUM VALVE
Martin Kapeker, Brooklyn, N.Y., assignor to Thermovac Industries Corp., Brooklyn, N.Y., a corporation of New York
Filed Feb. 12, 1963, Ser. No. 258,036
9 Claims. (Cl. 34—92)

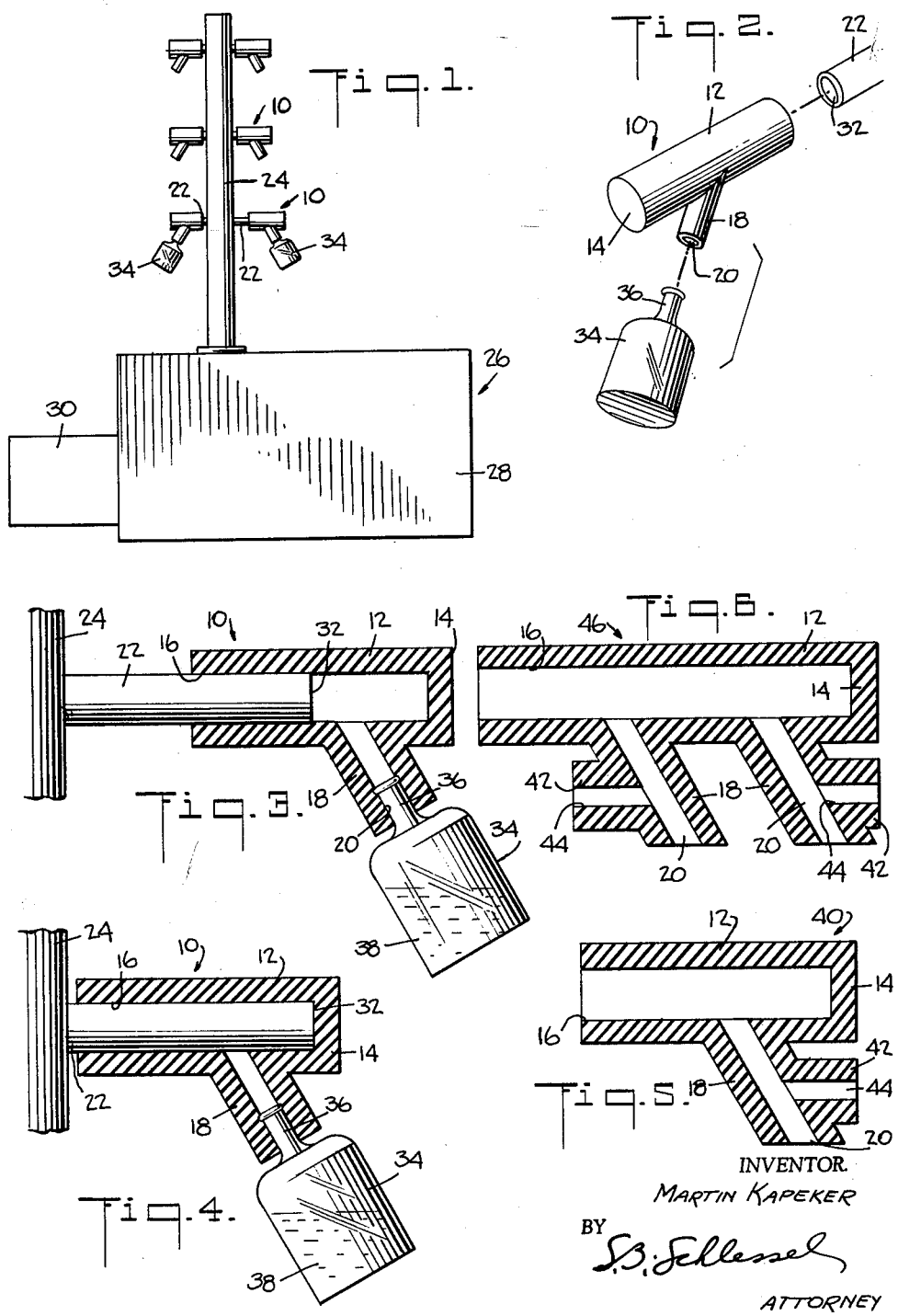
Jan. 12, 1965     M. KAPEKER     3,165,386
VACUUM VALVE
Filed Feb. 12, 1963
INVENTOR.
MARTIN KAPEKER
ATTORNEY

United States Patent Office 3,165,386
Patented Jan. 12, 1965

This invention relates to the field of freeze drying, and air or gas evacuation, and has for its principal object the creation of a valve by means of which the material to be dried, or the object, such as a radio tube or other instrument, to be evacuated, is connected to the drying or evacuating apparatus in such a manner as to alloy substantially unrestricted operation of the process and, upon its completion, removal of the container holding the dried matter, or of the tube, and replacement upon the apparatus of a new container or tube, without breaking or materially affecting the temperature or vacuum within the apparatus.

The purpose of freeze drying is to preserve organic materials which are heat-sensitive and labile by dehydrating this material without affecting its cellular integrity or effecting a physical or chemical change during the process, so that when the material is required for use the addition of the removed amount of water or liquid will restore it fully to its original condition. This is done by subliming the vapors of the frozen liquid or water content by creating a low temperature (approx. —60° F.), and high vacuum, and drawing off the frozen liquid with a high-powered vacuum pump. In this way organic materials, such as milk, blood, urine, tissue, meat, fish and the like, have water removed with little or no heat applied and with little or no cellular, physical or chemical change. They can be thus preserved for long periods of time, in some cases indefinitely, in such a state. The subsequent addition of the removed water restores the material to its original state when its use is desired. The creation of vacuum tubes by evacuation of air and gas requires no explanation.

Present types of freeze dryers, for example, include manifolds with a plurality of ports (from one to several hundreds), to each of which a flask, tube or other container holding the material to be dehydrated is attached. When the contents of the flask, tube or container have been dehydrated it must be removed from its connection port. Since low temperature and complete vacuum must be maintained during the entire process, should the port be exposed to the air in the process of removing the container the vacuum of the entire system will be broken, the temperature will rise and the material in the containers still attached to other ports of the system will be spoiled. Exposure of the contents of the removed container will, in some instances, cause damage to the contents.

The present method for attachment of, let us say, flasks to the ports of a freeze dryer involves the use of a rubber tube secured around each port and closed off by a plug. To attach the flask the operator manually pinches off the tube with a pair of pliers, removes the plug, attaches the flask and then releases the tube. This method is far from satisfactory since the tube must, of necessity, be of a heavy rubber which may not be closed off completely; continued application of the pinching process damages and destroys the rubber tube in short order; and the desired results of sustaining the low temperature and high vacuum in the freeze dryer and material are not always obtained.

Likewise, in present methods of using evacuating apparatus for the creation of vacuum tubes it often happens that the broken ends of the tubes which remain in the system after the tubes are sealed create damage to the apparatus.

It is therefore the principal object of my invention to create a valve for use in connection with freeze dryers and evacuators which permits attachment and removal of flasks, tubes and the like to such apparati without breaking or disturbing the vacuum within the system.

A second important object of my invention lies in the provision of a vacuum valve for freeze dryers and evacuators which permits operation of the respective apparati with little or no restriction.

A third important object of my invention lies in the provision of a vacuum valve which is simple to operate and which can be produced at a low cost.

A fourth important object of my invention lies in the provision of a vacuum valve by which the vacuum can be broken slowly and gently when desired, so as not to affect the material involved.

A fifth important object of my invention lies in the provision of a vacuum valve for attachment to the ports of a freeze dryer by which flasks of dehydrated material can be preserved by the introduction into the flask of an inert gas while the flask is still attached to the valve.

These and other salient objects, advantages and functional features of my invention, together with the novel features of construction, composition and arrangement of parts, will be more readily apparent from an examination of the following description, taken with the accompanying drawings, wherein:

FIG. 1 is a front view of a freeze dryer, to the ports of which preferred embodiments of my invention are attached;

FIG. 2 is an enlarged side perspective of one of the embodiments shown in FIG. 1, showing also the flask and, partly broken away, the port of the freeze dryer to which it was attached;

FIG. 3 is an enlarged vertical cross-section of the embodiment of FIG. 1, showing a flask in the process of being dehydrated;

FIG. 4 is a view similar to FIG. 3, but showing the valve in closed position on the dryer port;

FIG. 5 is an enlarged vertical cross-section of a modified embodiment of my invention; and FIG. 6 is an enlarged vertical cross-section of another modification of my invention.

Similar reference characters designate similar parts throughout the different views.

Illustrative of the embodiment shown by FIGS. 1–4, my vacuum valve 10 comprises a hollow tube 12, closed at one end 14 and open at the other end 16. Integral with the tube 12 is a second hollow tube 18 which opens into the tube 12 intermediate its body portion as shown, and provided open at its other end 20. The tube 18 may be at an inclined angle to the plane of the tube 12, as shown, or may be at right angles thereto, if desired. The vacuum valve 10 is preferably composed of a heavy, resilient rubber, but other suitable material, such as plastic, may be used in place thereof. As shown in FIG. 1, vacuum valves 10 are secured around the ports 22 of a freeze dryer manifold 24. The freeze dryer 26 comprises, as is well known in the art and therefore not further detailed herein since it forms no part of the invention, the usual housing 28 containing a refrigeration unit, a condenser and a high-powered vacuum pump 30, in open engagement with the manifold 24, and all interrelated as is well known in the art, and activated by the usual motor means.

A vacuum valve 10 is ordinarily in full engagement with each port 22 of the manifold 24, as more particularly shown in FIG. 4, so that the closed end 14 of such valve 10 provides an effective seal for the open end 32 of the port 22 to which it is secured. In this position of the valves 10 the manifold 24 is effectively sealed from the outer air.

In the operation of my invention, the freeze dryer 26 is first activated, with a valve 10 attached to each port 22 and in closed position, as shown in FIG. 4, until the inside temperature reaches at least −60° F., and the action of the pump 30 removes all air and gases from the manifold 24 and its ports 22. An open-neck flask 34 containing frozen organic material, such as, for example, blood, to be dehydrated is then secured to each valve 10 by inserting its neck 36 through the open end 20 of the tube 18. The tube 12 is then moved and partially withdrawn from the respective port 22, as shown in FIG. 5, so that there is a direct opening from the port 22 into the flask 34, the tube 12 meanwhile retaining a frictionally tight engagement with the outer wall of the port 22 to prevent entry of air. In this position the water vapor created from the frozen liquid portion of the organic material is sublimated and drawn off into the manifold, and from there into the condenser where it freezes to the walls thereof, the remaining gas being removed by action of the pump 30. The process continues until the organic matter 38 in the flask 34 is adequately dehydrated, at which point the valve 10 is pushed back into full engagement with the port 22, as shown in FIG. 4, effectively resealing the vacuum within the manifold 24 and permitting the removal of the flask 34 containing the now dehydrated organic material 38. The flask 34 can now be sealed, or filled with an inert gas, such as nitrogen, and stored until needed. Upon removal of the flask 34 containing the now dehydrated organic material 38, a new flask 34 containing further organic material to be dehydrated is connected to the valve 10 in the same manner as before, the valve 10 moved along the port 22 to open position as before, and the process repeated. As is obvious, with a freeze dryer having a plurality of ports 22 (some may have as many as a few hundred), and a valve 10 for each port 22, a flask or tube of organic material to be dehydrated can be secured to each valve 10 independently, removed independently when dehydration is completed, and replaced with another without materially disturbing the flasks secured to the remaining ports 22, or affecting their contents, and without breaking or otherwise disturbing the vacuum seal of the manifold 24 which is vital to its efficiency.

In FIG. 5 there is shown a vacuum valve 40 which is a modified embodiment of valve 10. Valve 40 is provided with the same structure as valve 10 but, in addition, there is provided a third hollow tube 42 integral with, and opening into, tube 18 intermediate its end 20 and its juncture with the tube 12. With valve 40 the flask 34 to be dehydrated is inserted into the tube 18 so that its neck 36 passes beyond the opening 44 of tube 42 into tube 18, providing an effective seal to the opening 44. The valve 40 is then moved to open the port 22 to the flask 34 until its contents are dehydrated. At this point valve 40 is moved back on the port 22 to seal the port 22, an inert gas is introduced through the tube 42, the flask 34 is partially removed from the tube 18 until its neck 36 clears the opening 44 in the tube 42, and the inert gas fills the flask 34, which is then removed, sealed and stored.

In FIG. 6 there is shown a valve 46 which is a modified embodiment of valve 40. In this embodiment the valve 46 is provided with a plurality of combinations of tubes 18 and 42, in the manner shown, so that more than one flask 34 may be dehydrated through the same port 22 at the same time.

In the description thus far disclosure has been made of the application of the various valves 10, 40 and 46, and in connection with use upon a freeze dryer for the purpose of dehydrating organic material. The valves 10, 40 and 46, and obvious modifications thereof, are equally effective in use with evacuating apparatus used to evacuate air and gases from tubes, such as television and radio tubes, electric light bulbs, and similar objects. In the manner previously described, with respect to the operation of a valve 10, for example, which is connected to a port of an evacuator, the tube to be evacuated is inserted by its neck into the tube 18 of the valve 10, and the valve 10 moved upon the port to open the port to the valve 10 and the tube to be evacuated. Upon completion of the evacuation process the valve 10 is moved back upon the port to seal the vacuum within the evacuator. The neck of the tube which has been evacuated is then closed and sealed, by heat or other suitable means, and the tube withdrawn. The severed neck portion of the evacuated tube is then removed from within the valve 10, and the valve 10 is then ready for the next tube to be evacuated. As is apparent, with use of valves 40 and 46, means to close off the neck of the vacuum tube, while within the valve 40 or 46, may be introduced through the tube 44 of the respective valve.

As is also well apparent from the foregoing drawings and description, my invention may serve other functions as well, in connection with vacuum apparatus. For example, a vacuum may be broken slowly and gently by the slow removal of a valve 10, 40 or 46 from closed positions upon ports, where a sudden break in the vacuum is undesirable. Other beneficial uses may occur to those skilled in the art.

The embodiments thus shown and described, therefore, are by way of illustration and not of limitation, and various changes may be made in the construction, composition and arrangement of parts without limitation upon or departure from the spirit and scope of the invention, or sacrificing any of the advantages thereof inherent therein, all of which are claimed herein.

Having described my invention, I claim:

1. In association with a freeze dryer and a flask of the types described, a vacuum valve formed of a resilient material comprising
   a first tube provided open at one end and closed at its other end, adapted to be slidably mounted upon and in air-tight engagement with a port of the freeze dryer, and
   a second tube integral with the first tube at a point intermediate the ends of the first tube and extending therefrom at an angle thereto,
   the second tube opening into the first tube at their point of union and provided open at its free end to receive the neck of the flask in air-tight engagement therewith,
   The valve material being sufficiently rigid to withstand collapse under vacuum suction and sufficiently flexible to permit the engagements hereinabove described.

2. A vacuum valve as described in claim 1, the resilient material being rubber.

3. In association with a freeze dryer and flasks of the types described, a vacuum valve formed of a resilient material and comprising
   a first tube provided open at one end and closed at its other end, adapted to be slidably mounted upon and in air-tight engagement with a port of the freeze dryer,
   tube means integral with the first tube intermediate its ends and extending therefrom at an angle thereto,
   said tube means opening into the first tube at their unions and provided open at the free ends thereof to receive the necks of flasks in air-tight engagement therewith,
   the valve material being sufficiently rigid to withstand collapse under vacuum suction and sufficiently flexible to permit the engagements hereinabove described.

4. In association with an evacuator, and a tube to be evacuated, of the types described, a vacuum valve formed of a resilient material comprising
   a first tube provided open at one end and closed at its other end, adapted to be slidably mounted upon and in air-tight engagement with a port of the evacuator, and
   a second tube integral with the first tube at a point intermediate the ends of the first tube and extending therefrom at an angle thereto, the second tube opening into the first tube at their point of union and provided open at its free end to receive the neck of the tube to be evacuated in air-tight engagement therewith, the valve material being sufficiently rigid to withstand collapse under vacuum suction and sufficiently flexible to permit the engagements hereinabove described.

5. In association with a freeze dryer and a flask of the types described, a vacuum valve formed of a resilient material comprising a first tube provided open at one end and closed at its other end, adapted to be slidably mounted upon and in air-tight engagement with a port of the freeze dryer, a second tube integral with the first tube at a point intermediate the ends of the first tube and extending therefrom at an angle thereto, the second tube opening into the first tube at their point of union and provided open at its free end to receive the neck of the flask in air-tight engagement therewith, and a third tube integral with the second tube at a point intermediate the ends of the second tube and extending therefrom at an angle thereto, the third tube opening into the second tube at their point of union and provided open at its free end, the opening of the third tube into the second tube being so positioned as to be blocked by the full insertion of the flask neck into the second tube and cleared by the partial withdrawal of the flask neck from the second tube, the valve material being sufficiently rigid to withstand collapse under vacuum suction and sufficiently flexible to permit the engagements hereinabove described.

6. A vacuum valve as described in claim 5, the resilient material being rubber.

7. In association with a freeze dryer and flasks of the types described, a vacuum valve formed of a resilient material comprising a first tube provided open at one end and closed at its other end, adapted to be slidably mounted upon and in air-tight engagement with a port of the freeze dryer, and a plurality of secondary tubes integral with the first tube at points intermediate the ends of the first tube in parallel, spaced relationship to each toher and extending at an angle from the first tube, the secondary tubes opening into the first tube at their points of union and provided open at their free ends to receive each the neck of a flask in air-tight engagement therewith, the valve material being sufficiently rigid to withstand collapse under vacuum suction and sufficiently flexible to permit the engagements hereinabove described.

8. In association with a freeze dryer and flasks of the types described, a vacuum valve formed of a resilient material comprising a first tube provided open at one end and closed at its other end, adapted to be slidably mounted upon and in air-tight engagement with a port of the freeze dryer, a plurality of secondary tubes integral with the first tube at points intermediate the ends of the first tube in parallel, spaced relationship to each other and extending at an angle from the first tube, the secondary tubes opening into the first tube at their points of union and provided open at their free ends to receive each the neck of a flask in air-tight engagement therewith, and a third tube integral with each secondary tube intermediate the ends of said secondary tube and extending therefrom at an angle thereto, each third tube opening into its respective secondary tube at their point of union and provided open at its free end, the opening of each third tube into its respective secondary tube being so positioned as to be locked by the full insertion of the flask neck into said secondary tube and cleared by the partial withdrawal of the flask neck from the secondary tube, the valve material being sufficiently rigid to withstand collapse under vacuum suction and sufficiently flexible to permit the engagements hereinabove described.

9. A vacuum valve as described in claim 7, the resilient material being rubber.

References Cited by the Examiner
UNITED STATES PATENTS

| | | | |
|---|---|---|---|
| 1,578,670 | 3/26 | Lough | 251—353 XR |
| 2,097,307 | 10/37 | Ruggles | 141—66 XR |
| 2,389,452 | 11/45 | Patterson | 34—5 XR |
| 2,749,002 | 6/56 | Perry | 141—66 XR |
| 2,893,607 | 7/59 | Vosbikian | 251—145 XR |
| 2,925,989 | 2/60 | Hempel | 251—145 |

M. CARY NELSON, *Primary Examiner.*